United States Patent
Nakano (10) Patent No.: US 7,422,381 B2
(45) Date of Patent: *Sep. 9, 2008

(54) SHUTTER APPARATUS AND OPTICAL APPARATUS HAVING THE SAME

(75) Inventor: Takashi Nakano, Narahino (JP)

(73) Assignee: Seiko Precision, Inc., Chiba (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/351,641

(22) Filed: Feb. 10, 2006

(65) Prior Publication Data

US 2006/0153560 A1    Jul. 13, 2006

Related U.S. Application Data

(63) Continuation of application No. PCT/JP04/12113, filed on Aug. 10, 2004.

(30) Foreign Application Priority Data

Aug. 29, 2003    (JP)    ............................. 2003-308150

(51) Int. Cl.
G03B 9/10 (2006.01)

(52) U.S. Cl. ...................................... 396/458; 396/493

(58) Field of Classification Search ................ 396/449, 396/451, 458, 493, 495, 496, 497, 501
See application file for complete search history.

(56) References Cited

U.S. PATENT DOCUMENTS 5,255,037 A    10/1993    Kobayashi 6,123,468 A *  9/2000    Furlani et al. ............... 396/463
6,585,429 B2   7/2003    Yaginuma et al.

FOREIGN PATENT DOCUMENTS

| JP | 4-116533 | 4/1992 |
|----|----------|--------|
| JP | 4-229844 | 8/1992 |
| JP | 8-292465 | 11/1996 |
| JP | 11-249196 | 9/1999 |
| JP | 2000-39646 | 2/2000 |
| JP | 2001066660 | 3/2001 |
| JP | 2001-117135 | 4/2001 |
| JP | 2001-194702 | 7/2001 |

OTHER PUBLICATIONS

International Search Report dated Oct. 28, 2004.

* cited by examiner

*Primary Examiner*—W. B. Perkey
*Assistant Examiner*—Rishi S Suthar
(74) *Attorney, Agent, or Firm*—Michaud-Duffy Group LLP (57) ABSTRACT

A shutter apparatus includes a shutter substrate having a shutter opening, two shutter blades that are pivotally provided in the shutter substrate and that have cam openings, and an operation member that is engaged with the cam openings and that drives to turn the two shutter blades. The two shutter blades move to form three states of a fully open state, a fully closed state, and a small aperture state in this order, in accordance with a movement of the operation member, the two shutter blades are positioned to interpose the shutter opening therebetween in the fully open state, a first shutter blade is positioned on the shutter opening and has an aperture opening in the small aperture state, and moves to the shutter opening in one direction while the state is shifted to the fully open state, the fully closed state, and the small aperture state, and a second shutter blade is reciprocated in the fully closed state that serves as a turning point.

7 Claims, 5 Drawing Sheets

SMALL APERTURE

FULLY CLOSED

FULLY OPEN

PRIOR ART

SHUTTER APPARATUS AND OPTICAL APPARATUS HAVING THE SAME

CROSS-REFERENCE TO RELATED APPLICATIONS

This application is a continuation of and claims priority to International Patent Application No. PCT/JP2004/012113 filed on Aug. 10, 2004, which claims priority to Japanese Patent Application Nos. 2003-308150 filed on Aug. 29, 2003, subject matter of these patent documents is incorporated by reference herein in its entirety.

BACKGROUND OF THE INVENTION

1. Field of the Invention

This invention generally relates to shutter apparatuses for optical apparatuses, and more particularly, to a shutter suitable for use in an optical apparatus such as a digital camera or camcorder.

2. Description of the Related Art

Recent years, a shutter apparatus included in an optical apparatus such as a camera or the like is driven by a motor. Cameras have been downsized at a remarkable speed. For instance, a digital camera installed on a mobile phone is particularly downsized. Accordingly, there exists a need for a more downsized shutter apparatus in a camera, and further, a simplified structure of the shutter apparatus.

The shutter apparatus includes a shutter blade that closes a shutter opening at the time of exposure. Generally, multiple sectors are used to close the shutter opening more quickly. As disclosed in Japanese Patent Application Publication No. 2001-117135 (hereinafter, referred to as Document 1), it is known that the shutter apparatus is configured to form a small aperture state by use of an aperture blade having an aperture opening. This shutter apparatus includes multiple shutter blades and the aperture blade.

Figure 5:
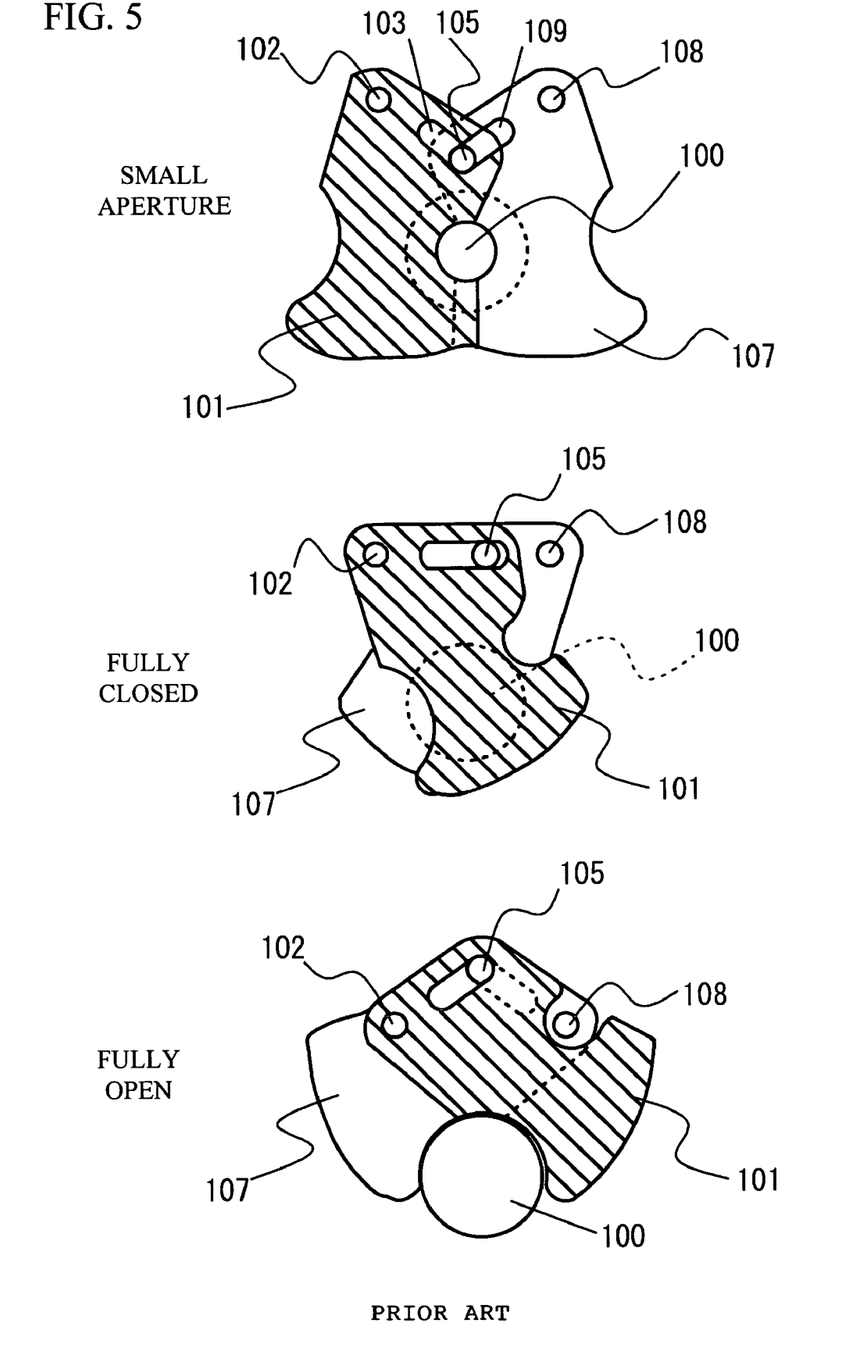
FIG. 5 shows the sector operation in the conventional shutter apparatus.

Japanese Patent Application Publication No. 2000-39646 (hereinafter, referred to as Document 2) discloses the shutter apparatus that forms a fully closed state and the small aperture state by use of two shutter blades. In Patent document 2, two sectors, which are an upper aperture blade and a lower aperture blade, are driven to open and close by a stepping motor. FIG. 5 shows a sector operation described in Document 2. A first sector 101 is pivotally provided with respect to a fixed shaft 102, and a second sector 107 is pivotally provided with respect to a fixed shaft 108. These sectors 101 and 107 are movably arranged in positions that open and close a shutter opening 100 provided in a shutter substrate.

Specifically, an opening 103 is provided in the first sector 101. In the same manner, an opening 109 is provided in the second sector 107. The openings 103 and 109 are pierced by an operation pin 105, and are engaged with each other. Thus, as shown in FIG. 5, it is possible to form a small aperture state, fully closed state, and fully open state by moving the operation pin 105 in a given direction to control the positions of the two sectors 101 and 107. With this configuration, it is possible to form the fully closed state and small aperture state by use of two sectors, thereby enabling the sector structure in the shutter apparatus.

In the shutter apparatus disclosed in the afore-mentioned Document 1, however, the aperture blade is used for forming the small aperture state, yet the aperture blade does not function when the shutter opening is closed. Therefore, this needs multiple shutter blades for exclusive use in the formation of the fully closed state, resulting in an increase of the number of sectors. On the other hand, in the shutter apparatus disclosed in Document 2, it is possible form the fully closed state (close) and the small aperture state with two shutter blades, thereby enabling the structure thereof to be simplified. However, only if the two shutter blades are respectively situated on given positions, the fully closed state or small aperture state can be formed. Therefore, in the shutter apparatus described in Document 2, it is necessary to control the positions of the both shutter blades with high accuracy.

In the shutter disclosed in Document 2, however, the openings 103 and 109 provided in the first sector 101 and the second sector 107 have simple structures. As the operation pin 105 moves upwardly, the above-mentioned first sector 101 and the second sector 107 form the small aperture state, fully closed state, and fully open state. In contrast, if the operation pin 105 moves downwardly from the fully open state, an opposite state is formed. Here, the fully closed state is existent between the small aperture state and the fully closed state.

Now, an inertial force (inertia) works, when the sectors 101 and 107 are moved from given positions to other ones. When the operation pin 105 that is driven by the stepping motor moves the sectors 101 and 107 to the fully closed position from the small aperture position, or when the operation pin 105 moves the sectors 101 and 107 to the fully closed position from the fully open position, which causes the hunting in some cases, according to the inertial force applied to the sectors and brake on the stepping motor side. That is to say, the inertial force is applied onto the sectors 101 and 107, although they stop moving at the fully closed position from a moving state. There is a force that causes the sectors 101 and 107 to oveimn from the fully opened position (stop position).

On the other hand, a braking effort (braking force) is electrically or magnetically applied onto the electrically controlled stepping motor so that the rotor may stop rotating at a given position. Therefore, at the fully closed position, the above-described inertial force and the braking force collide with each other to induce a vibrating state (the hunting) in moving directions of the sectors 101 and 107. If the sectors 101 and 107 vibrate in this manner, the sectors are misaligned from a predetermined fully closed position and let the light come in the opening 100 (hereinafter, referred to as reexposure state). It is impossible to capture an image appropriately by use of the optical apparatus, such as a camera, having the shutter apparatus that cannot shield the light completely on an originally configured fully closed position.

SUMMARY OF THE INVENTION

It is an object of the present invention to address the above-mentioned problems and provide a shutter apparatus that has a simple structure with use of two shutter blades and can prevent reexposure in a fully closed state.

The above-described object can be achieved by a shutter apparatus including: a shutter substrate having a shutter opening; two shutter blades that are pivotally provided in the shutter substrate and that have cam openings; and an operation member that is engaged with the cam openings and that drives to turn the two shutter blades. The two shutter blades move to form three states of a fully open state, a fully closed state, and a small aperture state in this order, in accordance with a movement of the operation member; the two shutter blades are positioned to interpose the shutter opening therebetween in the fully open state; a first shutter blade is positioned on the shutter opening and has an aperture opening in the small aperture state, and moves to the shutter opening in one direction while the state is shifted to the fully open state, the fully closed state, and the small aperture state; and a second shutter blade is reciprocated in the fully closed state that serves as a turning point. In accordance with the present invention, one of the two shatter blades has the aperture opening that forms the small aperture state, enabling to form the three states of the dully open state, fully closed state, and small aperture state with a simple configuration.

In addition, preferably, the two shutter blades respectively move in directions that close the shutter opening from both sides of the shutter opening when the state is shifted to the fully closed state from the fully open state. With this configuration, it is possible to form the state where the shutter opening is closed by both sides, thereby making it possible to close the shutter opening efficiently even with use of the two sectors. Accordingly, the two sectors are capable of realizing an increased shutter speed.

Further, preferably, a position of the second shutter blade is determined by the position of the operation member engaged with the cam openings. With this configuration, the second shutter blade does not overrun when situated on a fully closed position, thereby enabling to prevent the problem of reexposure certainly. Trajectories of the first and second shutter blades can be adjusted by designing the shapes of the cam openings appropriately.

The first shutter blade may have the aperture opening that overlaps the shutter opening in the fully closed state. Preferably, the second shutter blade has at least an area that shields the shutter opening. Preferably, the second shutter blade overlaps the shutter opening in the small aperture state. The shutter apparatus described heretofore can be downsized by suppressing the number of the parts. In addition, the problem of reexposure can be prevented. Accordingly, the optical apparatus having the above-described shutter apparatus therein can be downsized, whereby clear images can be captured.

As described above, in accordance with the present invention, it is possible to provide a shutter apparatus having a simplified sector structure. In addition, the shutter apparatus is capable of preventing reexposure at the time of fully closed state.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
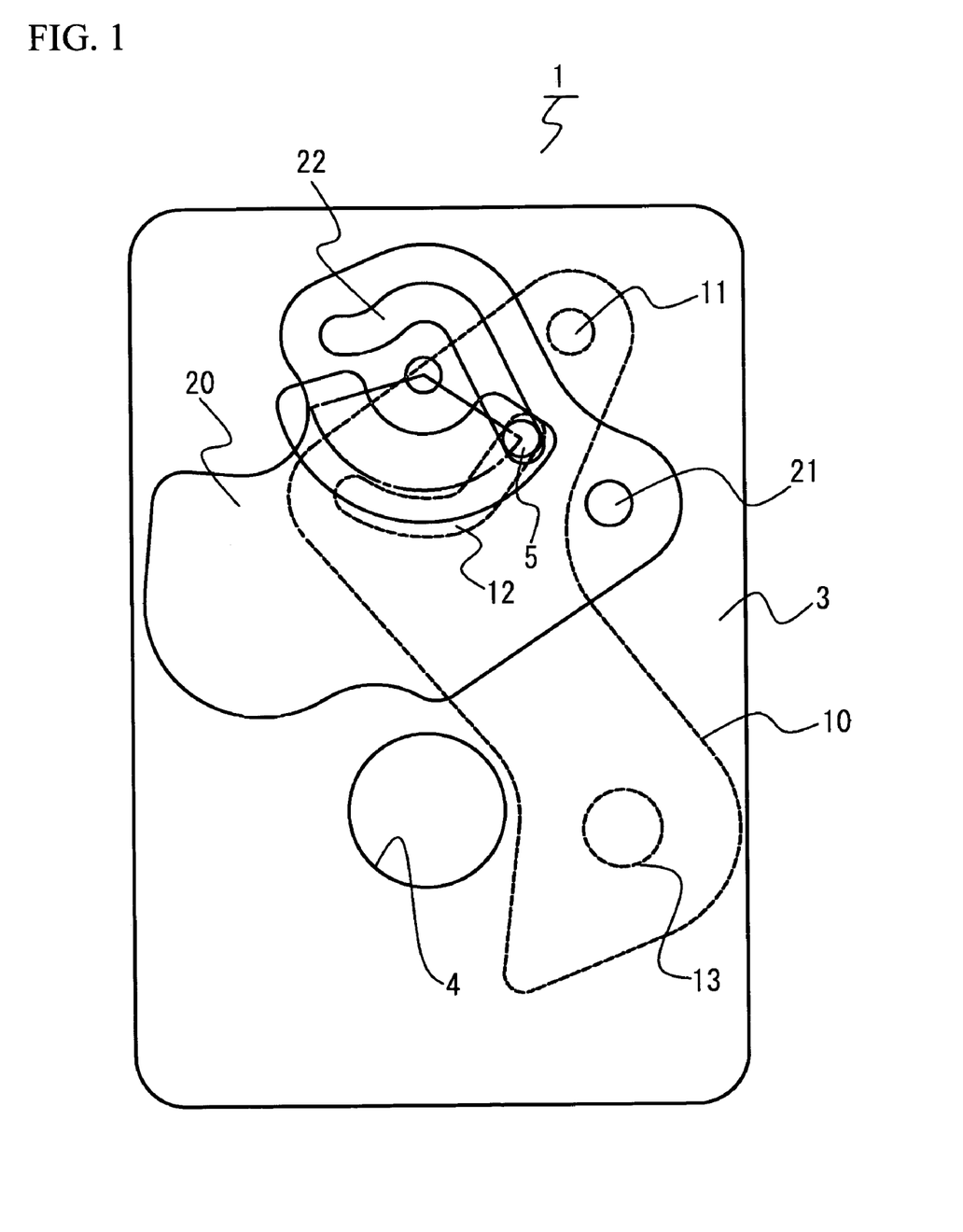
FIG. 1 shows a shutter apparatus in accordance with an embodiment of the present invention in a fully open state.
Figure 2A:
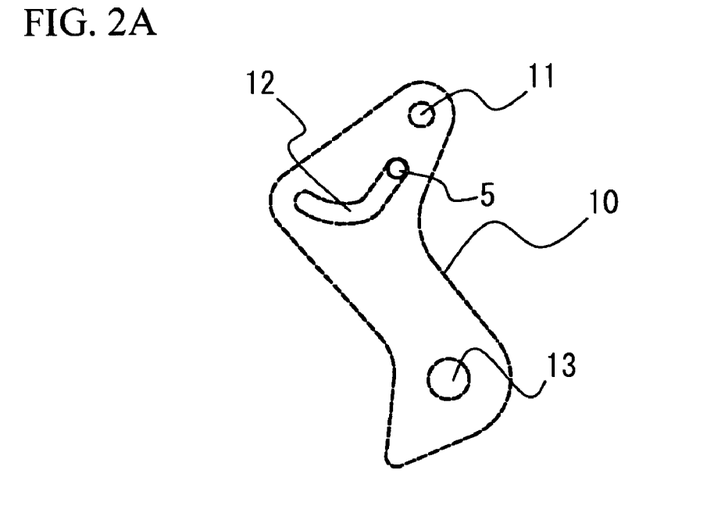
FIG. 2A through FIG. 2C are views partially showing the shutter apparatus shown in FIG. 1.

A description will now be given, with reference to the accompanying drawings, of an embodiment of the present invention. FIG. 1 shows a shutter apparatus 1 in accordance with an embodiment of the present invention in a fully open state. FIG. 2A though FIG. 2C are views partially showing the shutter apparatus 1 shown in FIG. 1. FIG. 3 is a view schematically showing a positional relationship between a shutter substrate included in the shutter apparatus 1 and a stepping motor 7. FIG. 4A through FIG. 4E are views showing the shutter apparatus 1 so that changes in the shutter blades can be confirmed when the state is shifted in the order of the fully open state, the fully closed state, and the small aperture state.

The shutter apparatus 1 is configured to include two sectors. The shutter apparatus 1 includes a shutter substrate 3 and two sectors 10 and 20. The shutter substrate 3 has a shutter opening 4 in the center thereof. The sector 10 is a first shutter blade and the sector 20 is a second shutter blade 20. The first shutter blade 10 includes an aperture opening, and serves as an aperture blade. The second shutter blade 20 is a shutter blade having a normal plate shape, and has an area that can solely shield the afore-mentioned shutter opening 4. Here, the first shutter blade 10 is indicated by a dotted line and the second shutter blade 20 is indicated by a solid line in order to facilitate the understanding of the respective shutter blades.

The first shutter blade 10 is pivotally provided around a fixed shaft 11, and includes a cam opening 12 and an aperture opening 13. The second shutter blade 20 is pivotally provided around a fixed shaft 21, and includes a cam opening 22. The operation pin (operation member) 5, which is driven within a given range, is engaged with the afore-mentioned cam openings 12 and 22 by the stepping motor, not shown. That is to say, it is configured that one operation pin 5 extends through two cam openings 12 and 22 and the two shutter blades 10 and 20 are moved to given positions by the movement of the operation pin 5.

Figure 2B:
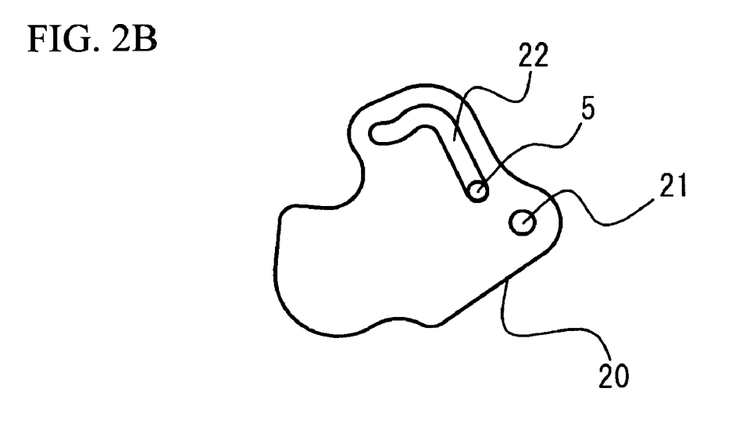
Figure 2C:
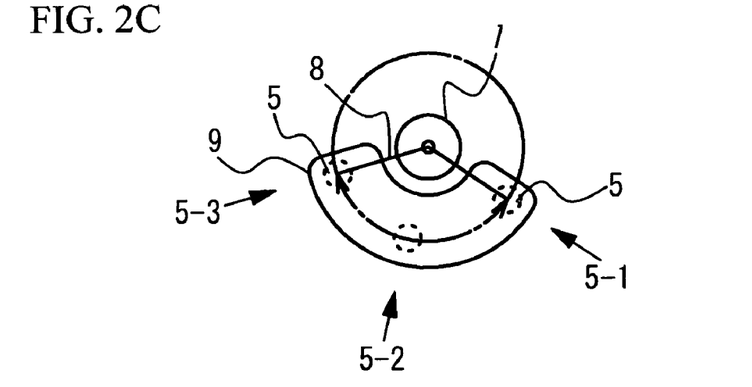
Figure 3:
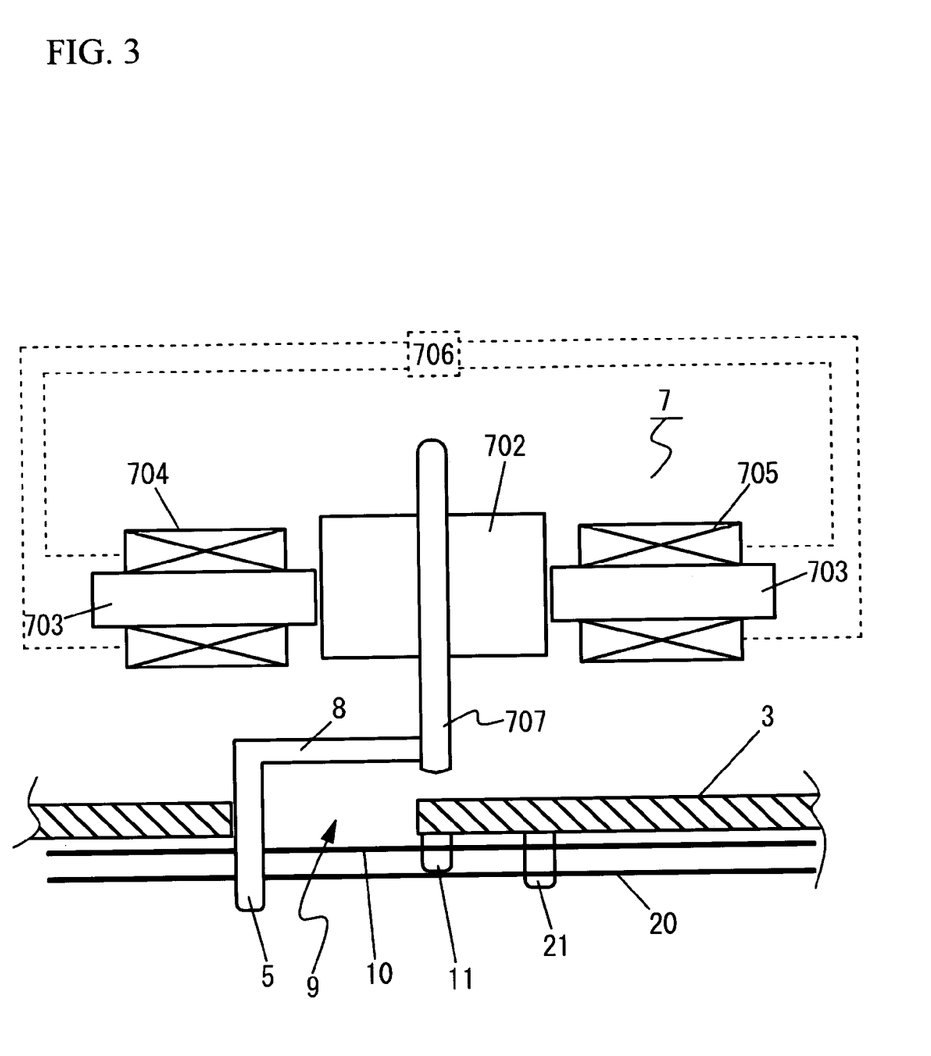
FIG. 3 is a plan view schematically showing the shutter apparatus to confirm a positional relationship between a shutter substrate included in the shutter apparatus and a stepping motor.

FIG. 2A through FIG. 2C are views partially showing the shutter apparatus shown in FIG. 1 to facilitate the understanding of the structure. FIG. 2A shows the first shutter blade 10, FIG. 2B shows the second shutter blade 20. The shutter blade 10 is an aperture blade having the aperture opening 13, yet moves the shutter opening 4 to a closed position for providing the fully closed state. In addition, the second shutter blade 20 has an area that can solely shield the shutter opening 4. FIG. 2C is an enlarged view showing a moving range of the operation pin 5. A position 5-1 corresponds to the fully open state shown in FIG. 1. Another position 5-2 corresponds to the fully closed state, and yet another position 5-3 corresponds to the small aperture state, as will be shown later in FIG. 4A through FIG. 4E.

FIG. 2C shows the stepping motor 7 that drives the operation pin 5 and an arm portion 8 that extends from the stepping motor 7. The operation pin 5 is fixed to the other end of the arm portion 8. There is provided an opening 9 having a fan shape in the shutter substrate 3 in such a manner that the operation pin 5 extrudes on the front surface side from the backside. Accordingly, the stepping motor 7 turns within a given range, and the operation pin 5 provided on the tip of the arm portion 8 swings within a given range in the opening 9 having a fan shape, as shown.

In the shutter apparatus 1, the shutter blades 10 and 20 swing in given trajectories and sequentially form the fully open state, the fully closed state, and the small aperture state, while the afore-mentioned operation pin 5 is moving in one direction. At this time, the first shutter blade 10 and the second shutter blade 20 move differently from each other. The first shutter blade 10 having the aperture opening 13 moves in one direction toward the shutter opening 4, as it sequentially forms the fully open state, the fully closed state, and the small aperture state. In the small aperture state, the aperture opening 13 is positioned on the shutter opening 4.

On the other hand, the second shutter blade 20 is positioned to close the shutter opening 4 while the state is changing to the fully closed one from the fully open one. However, the second shutter blade 20 is moved to recede from the shutter opening 4, while the state is changing to the small aperture state from the fully closed state. That is to say, the second shutter blade 20 is reciprocated at the fully closed position that serves as a turning point. Here, when the operation pin 5 reaches an end (a position 5-3 in FIG. 2C) and returns from the end, the first and second shutter blades 10 and 20 operate in an opposite manner of the operation described above.

The operations of the shutter blades 10 and 20 are regulated by the positions of the fixed shafts 11 and 21 that respectively support the blades and the shapes of the cam openings 12 and 22 respectively formed in the blades. In particular, the cam opening 22 of the second shutter blade 20 is reciprocated at the fully closed position that serves as a turning point, and is formed to change the moving direction, when reaching the fully closed state due to the movement of the operation pin 5. More specifically, when the second shutter blade 20 comes to the position that shields the shutter opening 4, the position of the cam opening 22 is shifted to a given direction. When the operation pin 5 further moves, the shape of the cam opening 22 is designed in such a manner that the second shutter blade 20 recedes from the shutter opening 4.

FIG. 3 is a view schematically showing a positional relationship between the shutter blade included in the shutter apparatus 1 shown in FIG. 1 and the stepping motor 7. The stepping motor 7 has a rotor 702 and a stator 703 provided in the peripheral thereof. FIG. 3 shows an end side of the stator 703. Two coils 704 and 705 are wound around the stator 703. The coils 704 and 705 are controlled to drive by a control circuit 706.

The shutter substrate 3 has the shutter opening 4 for image capturing, yet is not shown in FIG. 3. The two sectors 10 and 20 are arranged along the substrate surface on the front surface side of the shutter substrate 3. These sectors are the first shutter blade 10 and the second shutter blade 20 from the side of the shutter substrate 3. The stepping motor 7 is arranged on the backside of the shutter substrate 3.

The first shutter blade 10 has an opening to be engaged with the fixed shaft 11 provided in the substrate 3 and another opening to be engaged with the operation pin 5 connected to a rotor axis 707 of the stepping motor 7, although the positions of the openings cannot be confirmed. In the same manner, the second shutter blade 20 has an opening to be fit with the fixed shaft 21 provided in the substrate 3 and another opening to be engaged with the operation pin 5. The first shutter blade 10 and the second shutter blade 20 respectively swing in given trajectories, according to the turning operation of the operation pin 5, as described above. The operations of the blades 10 and 20 will be obvious in FIG. 4A through FIG. 4E, as will be described hereafter.

The arm portion 8 that projects in a radial direction is connected to the rotor axis 707 of the stepping motor 7 provided on the backside of the substrate 3. The operation pin 5 is connected to an end of the arm portion 8, and extends to an opposite side through the opening 9 having a fan shape provided on the side of the shutter substrate 3. The operation pin 5 that projects on the front surface side is engaged with the openings respectively provided in the first shutter blade 10 and the second shutter blade 20. Therefore, when the rotor 702 of the stepping motor 7 turns, the operation pin 5 turns in accordance with the movement thereof, and then the first shutter blade 10 and the second shutter blade 20 swing in given trajectories.

Figure 4A:
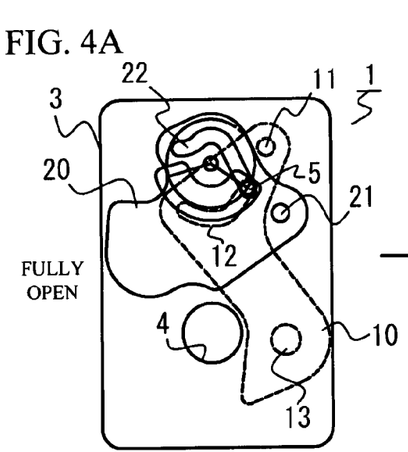
FIG. 4A through FIG. 4E are views showing the shutter apparatus 1 so that changes of shutter blades can be confirmed when the state is shifted in the order of a fully open state, fully closed state, and small aperture state.

The operation of the shutter apparatus 1 having the above-described configuration is continuously shown in FIG. 4A through FIG. 4E from the fully open state to the small aperture state. A description will be given with reference to FIG. 4A through FIG. 4E. FIG. 4A shows the fully open state shown in FIG. 1. In the fully open state, the operation pin 5 is positioned on a right end (a position 5-1 in FIG. 2C). At this time, the shutter blades 10 and 20 are moved to the positions to open the shutter opening 4 on the basis of the shapes of the cam openings 12 and 22. Here, in the shutter apparatus 1, as shown in FIG. 4A, the shutter blades 10 and 20 are designed to be positioned on the right and left with the shutter opening 4 interposed between the shutter blades 10 and 20.

Figure 4B:
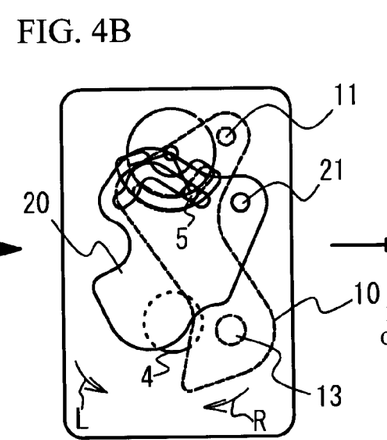

Next, as shown in FIG. 4B, the operation pin 5 moves from the right end in a left-hand direction, the both shutter blades 10 and 20 come near each other to close the shutter opening 4. Subsequently, as shown in FIG. 4C, the both shutter blades 10 and 20 form the fully closed state.

A description will be given of the fully closed state shown in FIG. 4C in detail. The second shutter blade 20 is formed to have a size that can solely shield the shutter opening 4. Accordingly, the shutter opening 4 can be closed by only the shutter blade 20. In addition, the positional relationship of the operation pin 5 and the cam opening 22 changes characteristically, when the second shutter blade 20 moves to the position that closes the shutter opening 4. That is to say, the second shutter blade 20 is guided to come near the shutter opening 4, when changing to (the fully closed) state shown in FIG. 4C from (the fully open) state shown in FIG. 4A. However, once the second shutter blade 20 comes to the position (the fully closed position) shown in FIG. 4C, the relationship between the operation pin 5 and the cam opening 22 changes. The operation pin 5 further moves in such a manner that the second shutter blade 20 moves in a direction of coming away (returning) from the shutter opening 4. Therefore, the second shutter blade 20 is capable of stopping stably on the position (the fully closed position) shown in FIG. 4C without causing the hunting.

Additionally, when the shutter apparatus 1 becomes the fully closed state, the first shutter blade 10 having the aperture opening 13 is moved to cover the shutter opening 4 in parallel. As described above, the second shutter blade 20 is solely capable of closing the shutter opening 4, yet a shielding period can be shortened, in other words, the shutter speed can be increased by moving the first shutter blade 10 to the position to close the shutter opening 4. In order to obtain such effects, the shutter apparatus in accordance with an embodiment of the present invention has the first shutter blade 10 and the second shutter blade 20, which are provided on both sides with the shutter opening 4 interposed therebetween.

Figure 4C:
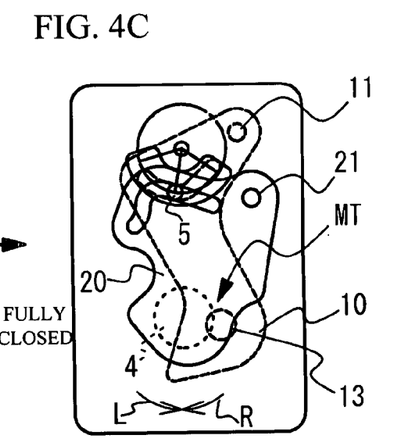

As seen in FIG. 4B and FIG. 4C, the first shutter blade 10 secondarily operates to close the opening 4 from an opposite side, whereas the second shutter blade 20 primarily closes the shutter opening 4. This enables to increase the shutter speed. Subsequently, as shown in FIG. 4C, when the fully closed state is completed, the second shutter blade 20 solely forms the state that shields the shutter opening 4. Accordingly, even if there is a portion MT where the aperture opening 13 in the first shutter blade 10 partially overlaps the shutter opening 4, the second shutter blade 20 completely closes the shutter opening 4. This does not let the light come in. Therefore, the first shutter blade 10 has only to have an area where at least the small aperture state can be formed, thereby enabling the shutter apparatus to be small.

Figure 4D:
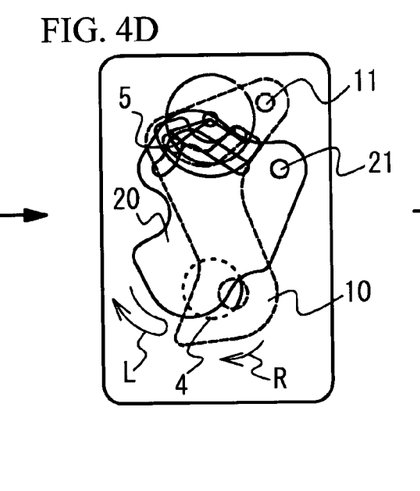

In addition, in the shutter apparatus 1, when the operation pin 5 further moves in a left-hand direction from the fully closed state shown in FIG. 4C, the first shutter blade 10 further moves toward the shutter opening 4 to form the small aperture state, as shown in FIG. 4D. In contrast, the second shutter blade 20 changes to turn and recede at the shutter opening 4 that serves as an end point. In FIG. 4A through FIG.

Figure 4E:
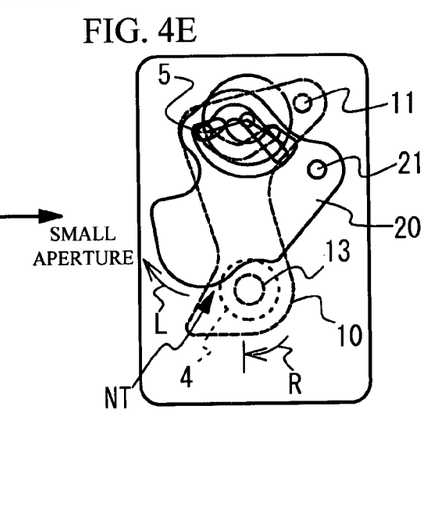

4E, an arrow R indicates the moving direction of the first shutter blade 10, and an arrow L indicates the moving direction of the second shutter blade 20 how the moving direction is changed.

Lastly, as shown in FIG. 4E, the operation pin 5 comes to a left end, and then the aperture opening 13 of the first shutter blade 10 is positioned on the shutter opening 4 to form the small aperture state. At this time, the second shutter blade 20 has moved to a position that does not interfere with the aperture opening 13. However, as shown in FIG. 4E, it is preferable that the second shutter blade 20 may be positioned to have a portion NT where the second shutter blade 20 partially overlaps a periphery of the shutter opening 4. The second shutter blade 20 positioned in this manner is capable of closing the shutter opening 4 more quickly than the state is shifted to the fully closed state from the small aperture state.

As described heretofore, the shutter apparatus 1 moves two shutter blades efficiently to form the fully open state, fully closed state, and small aperture state, while the operation pin 5 is moving in one direction. Accordingly, this enables to simplify the sector structure. Also, in the fully closed state, two shutter blades operate together to close the shutter opening 4, thereby enabling to increase the shutter speed. In addition, in the fully closed state, it is configured in such a manner that the second shutter blade 20 primarily operates and the first shutter blade 10 secondarily operates. This eliminates the necessity of controlling the positions of the both shutter blades with high accuracy, enabling to simplify the control system. Further, with respect to the second shutter blade 20, the cam opening 22 is so formed that the moving direction thereof is changed at the fully closed state. In other words, the second shutter blade 20 reverses the moving direction at the fully closed position to go away from the shutter opening 4. Therefore, the reexposure does not occur when the shutter blade 20 passes the shutter opening 4 to achieve the fully closed state. Thus, it is possible to capture a clear image by use of the optical apparatus such as a digital still camera having the shutter in accordance with an embodiment of the present invention as a part.

In the shutter structure, in some cases, there is provided a contact member to regulate the moving range of the sector. If the sector acutely hits this member, the sector may bounce back strongly or may be broken. With the structure of the cam opening in the second shutter blade 20, it is possible to obtain the effects that suppress a contact force applied onto the contact member. With the structure of the cam opening in the second shutter blade 20, the hunting is not caused, unlike the conventional shutter apparatus. This configuration also realizes the structure where loads are not excessively applied onto the stepping motor that generates the braking force.

Preferred embodiment has been described in detail heretofore, yet the present invention is not limited to the above-mentioned embodiment, and other embodiments, variations and modifications may be made without departing from the scope of the present invention.

What is claimed is:

1. A shutter apparatus comprising:
   a shutter substrate having a shutter opening;
   two shutter blades that are pivotally provided in the shutter substrate and that have cam openings; and
   an operation member that is engaged with the cam openings and that drives to turn said two shutter blades,
   wherein:
   said two shutter blades move to form three states of a fully open state, a fully closed state, and a small aperture state in this order, in accordance with a movement of the operation member;
   said two shutter blades are positioned to interpose the shutter opening therebetween in the fully open state;
   a first shutter blade has an aperture opening that forms the small aperture state when said first shutter blade is positioned on the shutter opening, and moves to the shutter opening in one direction while the state is shifted sequentially from the fully open state, to the fully closed state, and to the small aperture state; and
   a second shutter blade is reciprocated in the fully closed state that serves as a turning point.

2. The shutter apparatus as claimed in claim 1, wherein said two shutter blades respectively move in directions that close the shutter opening from both sides of the shutter opening when the state is shifted to the fully closed state from the fully open state.

3. The shutter apparatus as claimed in claim 2, wherein a position of the second shutter blade is deteimined by the position of the operation member engaged with the cam openings.

4. The shutter apparatus as claimed in claim 1, wherein said aperture opening of the first shutter blade overlaps the shutter opening in the fully closed state.

5. The shutter apparatus as claimed in claim 1, wherein the second shutter blade has at least an area that shields the shutter opening.

6. The shutter apparatus as claimed in claim 1, wherein the second shutter blade overlaps the shutter opening in the small aperture state.

7. An optical apparatus having a shutter apparatus comprising:
   a shutter substrate having a shutter opening;
   two shutter blades that are pivotally provided in the shutter substrate and that have cam openings; and
   an operation member that is engaged with the cam openings and that drives to turn said two shutter blades,
   wherein:
   said two shutter blades move to form three states of a fully open state, a fully closed state, and a small aperture state in this order, in accordance with a movement of the operation member;
   said two shutter blades are positioned to interpose the shutter opening therebetween in the fully open state;
   a first shutter blade has an aperture opening that forms the small aperture state when said first shutter blade is positioned on the shutter opening, and moves to the shutter opening in one direction while the state is shifted sequentially from the fully open state, to the fully closed state, and to the small aperture state; and
   a second shutter blade is reciprocated in the fully closed state that serves as a turning point.

* * * * *

UNITED STATES PATENT AND TRADEMARK OFFICE
CERTIFICATE OF CORRECTION

PATENT NO. : 7,422,381 B2  Page 1 of 1
APPLICATION NO. : 11/351641
DATED : September 9, 2008
INVENTOR(S) : Takashi Nakano It is certified that error appears in the above-identified patent and that said Letters Patent is hereby corrected as shown below:

Title page, Item (75), Inventors:
In the residence of the inventor, please delete "Narahino" and substitute --Narashino--

Title page, Item (73), Assignee:
Please delete the comma between Precision and Inc.

Title page, Item (63), Related U.S. Application Data:
Please delete "Aug. 10, 2004" and substitute --Aug. 24, 2004--

Signed and Sealed this

Twenty-eighth Day of October, 2008

JON W. DUDAS
*Director of the United States Patent and Trademark Office*